Sept. 30, 1969　　　　　O. Y. REECE　　　　　3,469,437
HORIZONTAL CRYOSTAT FOR FATIGUE TESTING
Filed June 2, 1967

INVENTOR
ORVIL Y. REECE
BY
ATTORNEYS

United States Patent Office 3,469,437
Patented Sept. 30, 1969

3,469,437
HORIZONTAL CRYOSTAT FOR FATIGUE TESTING
Orvil Y. Reece, Huntsville, Ala., assignor to the United States of America as represented by the Administrator of the National Aeronautics and Space Administration
Filed June 2, 1967, Ser. No. 644,447
Int. Cl. G01n 25/02
U.S. Cl. 73—15.6          5 Claims

ABSTRACT OF THE DISCLOSURE

A cryostat for use with horizontal testing machines. The cryostat, a rectangular Dewar vessel, is apertured on opposite sides for entry of horizontal load rods. At each aperture the load rod is held in position and a seal is provided by an outer sleeve joined to the walls, an inner Teflon sleeve and a Teflon washer. The Teflon sleeve contracts tightly around the load rod at cryogenic temperatures to minimize cryogen loss, while allowing free longitudinal movement of the rod.

---

The invention described herein was made by an employee of the United States Government and may be used by or for the Government for governmental purposes without the payment of any royalties thereon or therefor.

Background of the invention

This invention relates to devices for testing of materials at cryogenic temperatures and more particularly to a cryostat for use with horizontal testing machines.

The increasing use of liquid hydrogen and other cryogenic materials in the space program has created a need for extensive testing of metals and composite structures at cryogenic temperatures. Measurements of properties such as yield strength, tensile strength and fatigue at cryogenic temperatures are required for proper design and fabrication of structures and devices for use in conjunction with cryogenic liquids. In particular, information on the susceptibility of metal joints to fatigue at liquid hydrogen and liquid helium temperatures is needed to determine the suitability of the joints for applications involving prolonged exposures to such temperatures.

Fatigue testing at ordinary temperatures can be carried out by using available testing devices such as a Schenck machine wherein speimens are subjected to repeated, closely controlled cycles of tensile and compressive forces applied and measured by means of horizontally extending load rods. The previously available cryostats for material testing have normally been designed for application of vertical forces only so that they cannot be used with a horizontal testing machine. In addition, most of the previously available cryostats have not been suitable for extended used at liquid helium temperature (—450° F.). A critical feature in the design of a horizontal cryostat for use at liquid helium temperature, and the feature wherein previously available cryostats have been deficient, is the provision of a suitable seal at the rod entry ports to allow free horizontal movement of the load rods while preventing excessive loss of helium. The low heat of vaporization of liquid helium (675 calories per liter) in addition to its lower temperatures requires a much more effective seal than is required for liquid hydrogen (heat of vaporization, 7.560 calorits per liter; temperature, —423° F.).

Summary of the invention

The present invention comprises a cryostat for use with horizontal testing machines, the cryostat having oppositely disposed apertures in two walls thereof for entrance of load rods extending horizontally from a testing machine. At each aperture the load rod is positioned and guided, and a seal is provided by means of an outer sleeve joined to the multiple walls of the cryostat, an inner Teflon sleeve disposed within the outer sleeve and having an integral flange on its outside end and a Teflon washer disposed inside the innermost wall. Loss of cryogen minimized by contraction of the Teflon sleeve tightly around the rod at cryogenic temperatures and by the positive pressure provided by vaporization of any cryogen which escapes past the Teflon washer. The self-lubricating action of Teflon allows free longitudinal movement of the load rods despite the tight fit.

It is therefore an object of this invention to provide a cryostat for use in conjunction with horizontal testing machines.

Another object is to provide a cryostat capable of maintaining a temperature down to —450° F. during application of horizontal forces to specimens.

Still another object is to provide a seal which will allow free movement of a horizontally extending rod through a multiple-wall cryostat with minimum loss of cryogen.

Other objects, features and advantages of the invention will be apparent from the following description, taken in conjunction with the drawing.

Description of the preferred embodiment

Figure 1:
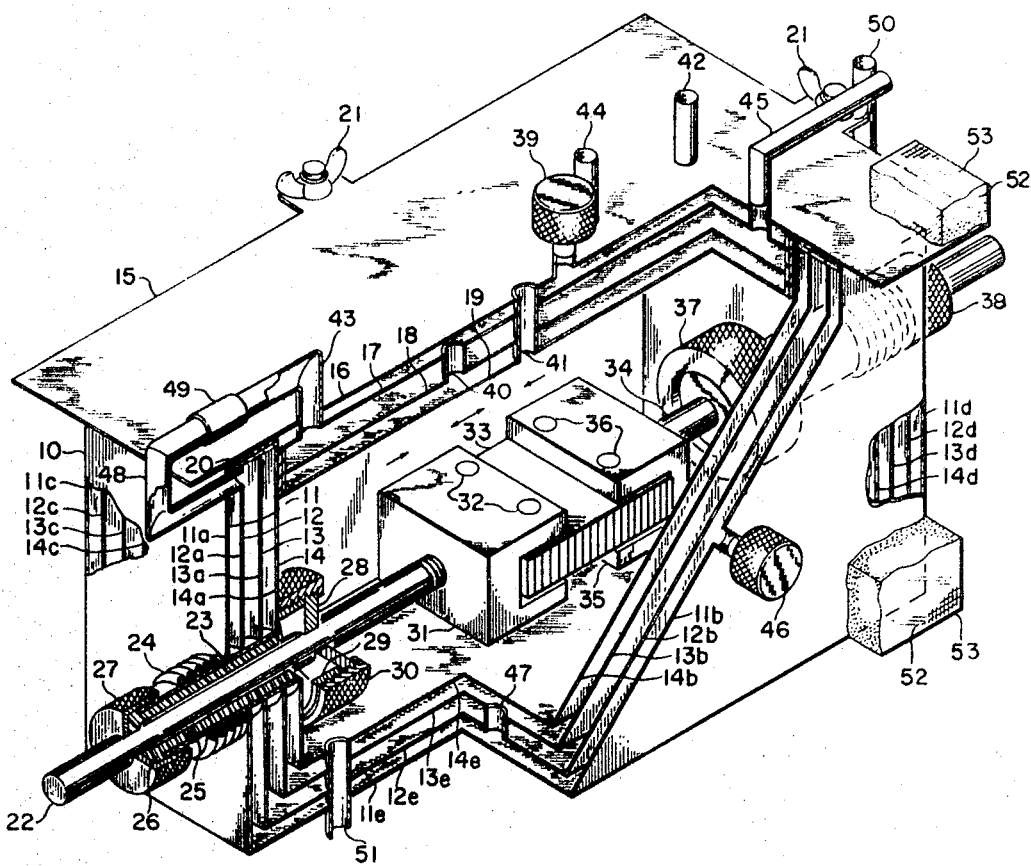
FIGURE 1 is an isometric view of the horizontal cryostat, with parts broken away to show the interior components.
Figure 2:
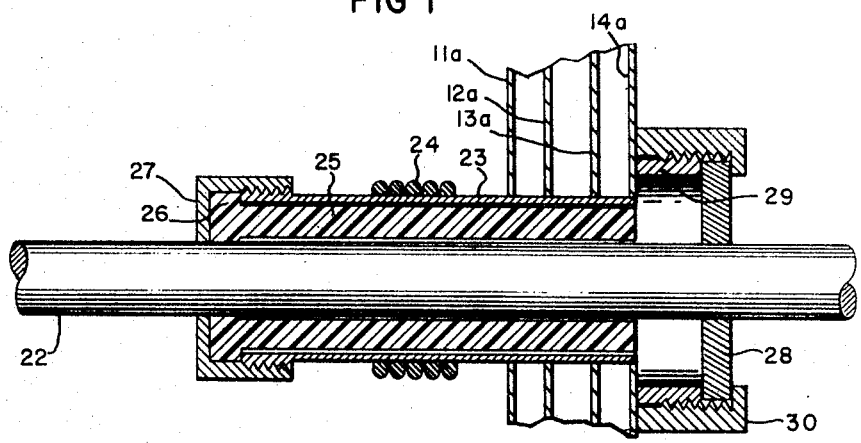
FIGURE 2 is an enlarged cross-sectional view taken at the juncture of a load rod with the cryostat walls.

Referring in detail to the drawing reference number 10 designates a generally rectangular Dewar vessel having spaced apart stainless steel walls 11, 12, 13 and 14. Thermal shielding of the test specimen from the ambient atmosphere is obtained by a double vacuum layer and a layer of cryogenic fluid intermediate thereto between the walls. The walls of the cryostat comprise, respectively, front portions 11a, 12a, 13a and 14a; side portions 11b, 12b, 13b, 14b, 11c, 12c, 13c and 14c; back portions 11d, 12d, 13d and 14d; and bottom portions 11e, 12e, 13e and 14e.

The Dewar vessel is closed at its top by a multiple-walled cover 15 of a construction similar to the vessel itself. The cover 15 has an outer wall 16 and spaced apart inner walls 17, 18 and 19, the innermost wall 19 being folded toward outer wall 16 so that the cover 15 fits exactly onto the top of the Dewar vessel 10. A gasket 20 made from an insulating material such as Teflon is inserted between the cover 15 and the Deward vessel 10 to inhibit heat transfer. The cover 15 is secured to the vessel 10 by a plurality of securing means 21 of the conventional wing-nut design.

The front wall portions 11a, 12a, 13a and 14a of walls 11, 12, 13 and 14, respectively, are apertured at a generally central location by circular, centraly aligned apertures so that a load rod 22 constructed of a material such as titanium can extend therethrough. An outer sleeve 23 constructed of stainless steel extends through the apertures and is joined to the respective wall portions 11a, 12a, 13a and 14a at the juncture therewith. A flexible bellows 24 is provided on the portion of outer sleeve 23 which extends out from the Dewar vessel 10 to facilitate precise alignment of the load rod. An inner Teflon sleeve 25 having an integral flange portion 26 is disposed within outer sleeve 23 to provide a seal and yet allow free longitudinal movement of load rod 22. The inner diameter of inner Teflon sleeve 25 is larger than the diameter of load rod 22 by a small increment, for example about .012 inch for a .5 inch rod, to allow contraction of the sleeve to porduce a tight fit at cryogenic temperatures. The amount of this incerment depends on the diameter of the load rod, with a larger increment being required for larger rods. The outer diameter of inner Teflon sleeve 25 is slightly smaller than the inner diameter of outer sleeve 23, for example by about .030 inch, to allow for alinement adjustments.

The integral flange 26 on inner Teflon sleeve 25 extends radially outward so as to mate with the end of outer sleeve 23. The inner diameter of inner Teflon sleeve 25 is reduced at the flanged end portion to fit the load rod 22 as tightly as possible. Inner Teflon sleeve 25 is held in position by means of end cap 27 having internal screw threads mating with external screw threads on the outer end of outer sleeve 23.

A Teflon washer 28 dimensioned to fit tightly around load rod 22 is positioned inside inner wall portion 14a in axial alignment with inner sleeve 25. Screw cap 30 holds the washer 28 tightly in position against a collar 29 joined to wall portion 14a, internal threads on screw cap 30 mating with external threads on collar 29. Load rod 22 is threadably connected to a tensile clevis 31 having two clevis pins 32 for securing one end of a metal honeycomb panel test specimen 33 in position for fatigue testing.

Rear wall portions 11d, 12d, 13d and 14d of walls 11, 12, 13 and 14 are apertured at a point directly opposite the apertures through front wall portions 11a, 12a, 13a and 14a. Load rod 34 extends through the apertures in axial alignment with load rod 22 and is threadably attached to tensile clevis 35 having two clevis pins 36 for securing the opposite end of specimen 33.

An outer sleeve, inner Teflon sleeve with integral flange, Teflon washer, collar (not shown) and end caps 37 and 38 are positioned at the junctuer of load rod 34 and the apertures through rear wall portions 11d, 12d, 13d and 14d to provide the same sealing arrangement for rod 34 as is depicted for rod 22 at the juncture with the apertures in front wall portions 11a, 12a, 13a and 14a.

The cover 15 has a bonnet valve 39 capable of communicating the space between walls 16 and 17 with a vacuum pump for evacuating the air therefrom. Crossover port 40 extends from wall 17 to wall 18 and serves to communicate the space between walls 18 and 19 with the space between walls 16 and 17 to evacuate the space between walls 18 and 19. The cover 15 also has a thermocouple port 41 and a cryogen inlet 42 extending therethrough. Inlet 43 is provided in cover 15 for introduction of cryogen into the space between walls 17 and 18. The Dewar vessel 10 has a vent 44 extending through cover 15, and the cover 15 has a vent 45 extending from the space between walls 17 and 18 to the atmosphere.

The Dewar vessel 10 has bonnet valve 46 that is capable of communicating the space between walls 11 and 12 with a vacuum pump for evacuating the air therefrom. Crossover port 47 extends from wall 12 and wall 13 to communicate the space between walls 11 and 12 with the space between walls 13 and 14 so that the latter space is also evacuated. Vent 48 extends from the space between walls 12 and 13 to the exterior. Vent 48 is shown connected to cover inlet 43 by means of sleeve 49 to provide for pre-cooling of cover 15. Inlet 50 extends from the space between walls 12 and 13 to the exterior. The Dewar vessel 10 has a conventional drain 51 extending through the bottom portion thereof. The Dewar vessel 10 and cover 15 are further insulated by an outside layer of polyurethane foam 52 covered with a fiberglass-phenolic resin sheet 53.

Operation

In operation of the horizontal cryostat a test specimen 33 is rigidly secured at opposite ends to horizontally extending load rods 22 and 34. The load rods 22 and 34 extend through opposite wall portions 11a, 12a, 13a, 14a and 11d, 12d, 13d and 14d, respectively, for engagement with a horizontal testing machine capable of longitudinally applying tensile or compressive forces or a combination thereof to the load rods in a controlled manner. The cover 15 is secured tightly and the spaces between walls 16 and 17, 18 and 19, 11 and 12 and 13 and 14 are evacuated by vacuum pumping through bonnet valves 39 and 46.

A cryogenic fluid such as liquid nitrogen or liquid hydrogen is introduced into the space between walls 12 and 13 through inlet 50. Cooling efficiency is enhanced by circulating the off-gas therefrom through sleeve 49 and inlet 43 into the space between cover walls 17 and 18. The off-gas from the cover can then be further circulated through cryogen inlet 42 to pre-cool the test sample and holding fixtures. The space between the walls 17 and 18 is then filled with a cryogenic liquid through inlet 43 and the off-gas therefrom is circulated through cryogen inlet 42 for further pre-cooling. A cryogenic liquid such as liquid nitrogen, liquid hydrogen or liquid helium, depending on the temperature desired, is then introduced through inlet 42 so that the test specimen 33 is submerged therein. For the colder temperatures, it is preferred to pre-cool the apparatus with liquid nitrogen, and then introduce liquid hydrogen or helium.

Tensile or compressive forces, or any combination thereof, are applied to the test specimen by longitudinal movement of load rod 22, load rod 34, or both. In fatigue testing with a Schenck machine alternating cycles of tension and comperssion are applied through rod 22, with rod 34 being held stationary by a fixture on the machine.

Load rod 22 can be moved freely through Teflon washer 28 and inner Teflon sleeve 25 owing to the self-lubricating properties of Teflon, and this feature likewise holds true for load rod 34. Teflon inner sleeve 25 contracts tightly around rod 25 at cryogenic temperatures so that loss of cryogen is minimized. The influx of heat through rod 22 gassifies any liquid cryogen which escapes past washer 28 and inner Teflon sleeve 25 and providing a positive pressure therein to further inhibit escape of cryogenic liquid.

The cryostat described above can be used for any temperature down to liquid helium temperature (—450° F.). For temperatures down to —320° F. gaseous nitrogen can be used as the cryogen fluid both in the shielding space between walls 12 and 13 and 17 and 18 and inside the Dewar vessel 10. For —320° F. liquid nitrogen can be used for both the shielding space and the Dewar vessel. For —423° F. liquid hydrogen is used in the Dewar vessel and liquid hydrogen or liquid nitrogen, the latter being preferred by reason of its lower cost, is employed in the shielding space. For —450° F. liquid helium is used in the Dewar vessel and liquid hydrogen or liquid nitrogen is used in the shielding space.

The horizontal cryostat of this invention can be used to carry out any testing involving horizontal application of tensile or compressive forces, or any combination thereof, to test specimens. While the invention is described primarily with reference to fatigue testing, it is to be understood that other testing involving these forces, for example, tensile strength and yield strength testing, can also be carried out by using the appropriate testing machine in conjunction with the cryostat. The test specimen can be a homogeneous material such as a metal or alloy sample or a heterogenous, composite structure such as a honeycomb panel.

It will be obvious to those skilled in the art that many variations may be made in the embodiments described above for the purpose of illustrating the invention without departing from the scope thereof as defined by the appended claims.

What is claimed is:

1. A cryostat for application of horizontal forces to a test specimen at extremely low temperatures comprising in combination:

(a) a Dewar vessel open at the top and including containers spaced apart within one another each container having a front wall portion, two side wall portions, a rear wall portion and a bottom wall portion, said containers enclosing between one another an intermediate region for holding a cryogenic fluid an inner vacuum region and an outer vacuum region;

(b) a cover for tightly closing said Dewar vessel;

(c) means for injecting cryogenic fluid into said Dewar vessel;

(d) means for evacuating said inner vacuum region and said outer vacuum region;

(e) means for injecting cryogenic fluid into said intermediate region;

(f) means for supporting a specimen within said Dewar vessel and applying horizontal forces thereto including a first load rod horizontally penetrating said front wall portions of said containers through circular, centrally aligned apertures therein, a second load rod horizontally penetrating said rear wall portions of said containers through circular, centrally aligned apertures therein, said first load rod being in axial alignment with said second load rod and means for securing said load rods to opposite ends of said specimen in said Dewar vessel;

(g) means for maintaining each of said rods in sealed, longitudinally slideable relationship with said apertures including an outer sleeve extending through said apertures and joined to each of said containers at the juncture therewith, an inner Teflon sleeve disposed within said outer sleeve and having an outer diameter slightly smaller than the inner diameter of said outer sleeve and an inner diameter larger than the diameter of the rod extending therethrough by an increment sufficient to provide a tight fit between said rod and said inner sleeve at cryogenic temperatures, said inner sleeve being provided with an integral, radially extending flange at the end outside the outermost container and a decreased inner diameter at said end, a tightly fitting Teflon washer disposed inside the innermost of said containers in axial alignment with said inner sleeve, means for tightly securing said flange to the outside end of said outer sleeve and means for tightly securing said washer to said innermost container.

2. Apparatus as defined in claim 1 wherein said cover comprises spaced apart sheets joined at the edges thereof and enclosing an intermediate region for holding a cryogenic fluid, an inner vacuum region and an outer vacuum region, means for introducing cryogenic fluid into said intermediate region in said cover and means for evacuating said vacuum regions in said cover.

3. Apparatus as defined in claim 1 wherein a flexible bellows is provided in said outer sleeve outside the outermost of said containers.

4. Apparatus as defined in claim 1 wherein the inner diameter of said inner Teflon sleeve is larger than the diameter of the load rod extending therethrough by an increment of about .012 inch for a load rod of approximately 0.5 inch in diameter.

5. In a cryostat having multiple, containers with flat walls spaced-apart within one another and a longitudinally slideable load rod extending perpendicularly through apertures in the walls, a seal comprising in combination:

(a) an outer sleeve extending through the apertures penetrated by said rod, said outer sleeve being joined to each of said walls at the juncture therewith;

(b) an inner Teflon sleeve disposed within said outer sleve and having an outer diameter slightly smaller than the inner diameter of said outer sleeve and an inner diameter larger than the diameter of said load rod by an increment sufficient to provide a tight fit therewith at cryogenic temperatures, said inner sleeve having an integral, radially extending flange at the end outside the outermost cryostat wall and a decreased inner diameter at said end;

(c) a tightly fitting Teflon washer disposed around said load rod inside the innermost cryostat wall in axial alignment with said inner sleeve;

(d) means for tightly securing said flange to the outside end of said outer sleeve, and (e) means for tightly securing said washer to the innermost wall of the cryostat.

References Cited

UNITED STATES PATENTS

| | | | |
|---|---|---|---|
| 3,078,708 | 2/1963 | McClintock | 73—15.6 |
| 3,140,602 | 7/1964 | Barth | 73—15.6 |
| 3,212,320 | 10/1965 | McClintock | 73—15.6 |
| 3,370,155 | 2/1968 | Belliveau | 73—15.6 |

RICHARD C. QUEISSER, Primary Examiner

R. S. SALZMAN, Assistant Examiner